United States Patent
Liwei et al.

(10) Patent No.: US 10,829,673 B2
(45) Date of Patent: Nov. 10, 2020

(54) WATER-BASED ADHESIVE FOR THE BONDING OF CELLULOSE BASED SUBSTRATES

(71) Applicant: BOSTIK SA, La Plaine Saint Denis (FR)

(72) Inventors: Yu Liwei, Shanghai (CN); Li Yong, Shanghai (CN); Yuan Xinheng, Shanghai (CN)

(73) Assignee: BOSTIK SA, Colombes (FR)

( * ) Notice: Subject to any disclaimer, the term of this patent is extended or adjusted under 35 U.S.C. 154(b) by 181 days.

(21) Appl. No.: 16/108,255

(22) Filed: Aug. 22, 2018

(65) Prior Publication Data

US 2019/0062607 A1    Feb. 28, 2019

(30) Foreign Application Priority Data

Aug. 22, 2017    (EP) .................................... 17187319

(51) Int. Cl.

| | | |
|---|---|---|
| *C09J 147/00* | (2006.01) | |
| *C09J 111/02* | (2006.01) | |
| *C09J 133/02* | (2006.01) | |
| *C09J 133/04* | (2006.01) | |
| *C09J 133/20* | (2006.01) | |
| *C09J 193/00* | (2006.01) | |
| *B32B 27/10* | (2006.01) | |
| *B32B 29/06* | (2006.01) | |
| *C09J 133/08* | (2006.01) | |
| *C09J 133/12* | (2006.01) | |
| *C09J 111/00* | (2006.01) | |
| *C09J 151/00* | (2006.01) | |

(52) U.S. Cl.
CPC ............ *C09J 147/00* (2013.01); *B32B 27/10* (2013.01); *B32B 29/06* (2013.01); *C09J 111/00* (2013.01); *C09J 111/02* (2013.01); *C09J 133/08* (2013.01); *C09J 133/12* (2013.01); *C09J 151/00* (2013.01); *C09J 193/00* (2013.01)

(58) Field of Classification Search
CPC ........ C09J 111/00; C09J 111/02; C09J 133/08; C09J 133/12
See application file for complete search history.

(56) References Cited

U.S. PATENT DOCUMENTS

| | | |
|---|---|---|
| 4,722,954 A | 2/1988 | Hallworth et al. |
| 6,548,579 B2 | 4/2003 | Reski et al. |
| 2002/0010256 A1 | 1/2002 | Reski et al. |
| 2008/0128083 A1 | 6/2008 | Williams et al. |
| 2013/0018153 A1 | 1/2013 | Christell et al. |

FOREIGN PATENT DOCUMENTS

| | | |
|---|---|---|
| CN | 105733156 A | 7/2016 |
| JP | 2008074950 A | 4/2008 |
| WO | 0174963 A1 | 10/2001 |

OTHER PUBLICATIONS

Computer-generated English-language translation of CN104448152A.*
European Search Report for EP17187319 dated Jan. 26, 2018.
English Abstract Provided for JP2008074950, Publication Date: Apr. 3, 2008.
English Abstract Provided for CN105733156, Publication Date: Jul. 6, 2016.

\* cited by examiner

*Primary Examiner* — Vu A Nguyen
(74) *Attorney, Agent, or Firm* — Millen, White, Zelano and Branigan, P.C.

(57) ABSTRACT

Water-based adhesive composition comprising:
from 30% to 60% by weight (expressed as dry content) of a chloroprene modified acrylic emulsion (A); and
from 0.05% to 0.45% by weight (expressed as dry content) of a water soluble polymer (B) selected among xanthan gum and konjac gum;
said composition being obtainable by a process (P) comprising a first step (i) of dissolving into water polymer (B) in the form of a powdered solid.
Use of said composition, for the bonding of at least one cellulose based substrate.

15 Claims, No Drawings

WATER-BASED ADHESIVE FOR THE BONDING OF CELLULOSE BASED SUBSTRATES

The present invention relates to a new water-based adhesive composition and to its use for the bonding of at least one cellulose based substrate.

The assembly, by means of water-based adhesive compositions, of cellulose based substrates or of cellulose based substrates with non-cellulose based substrates is currently performed in various industries, including the rigid packaging industry, for the assembly of cardboards and the bookbinding and/or graphic arts industry.

In this latter industry, adhesive compositions are used for the binding, including for attaching the pages of a book together and attaching the book's cover and the book's spine. They are also used to make the hardcover book covers. Given that the final products include magazines, catalogs, brochures, and more, the cellulose based substrates which are involved are extremely diverse. These substrates include: cardboard, papers of various weights and various surface coatings for instance matt paper and glossy paper having one face coated with a UV primer, such as an acrylic primer. Non cellulose based substrates include PolyVinyl-Chloride (PVC) films, PolyEthyleneTerephtalate (PET) films and low surface tension plastic films, such as Oriented PolyPropylene (OPP) films.

Water-based adhesive compositions currently used in bookbinding are mainly water-based emulsions (or dispersions). Water-based emulsions have the advantage that they can be applied at room temperature and that the water carrier provides excellent penetration into the paper, which helps create the high strength bond necessary to hold the book together. They are usually applied, on one or two of the substrates to be assembled, by high-speed continuous processes which implement such equipment or devices as rolling coaters, spray coaters and screen printing.

Current water-based emulsions are most often based on PolyVinyl Acetate (PVAc) homopolymers, Vinyl Acetate Ethylene (VAE) copolymers or on acrylic (co)polymers.

Such adhesives are required to provide assemblies which comprise at least one cellulose based substrate and a high strength adhesive joint and which are able to survive long-term storage conditions. Among the cellulose based substrates, those which are coated with a UV primer, such as an acrylic primer, are particularly difficult to bond, owing to the high density of the coating and difficult penetration of water.

In order to meet the constraints of the high-speed continuous processes used in the bookbinding or the rigid packaging industries, these water-based adhesive compositions are also expected to have a fast setting speed, in other terms to have the ability, immediately after their application and formation of a two substrates assembly, to set a bond rapidly and to maintain this bond after a short application of pressure. This fast setting property is also designated by the terms of "wet tack" or "fast bonding".

The patent application CN 104448152A filed by CAS GUANGZHOU CHEMISTRY CO LTD teaches a fast-bonding type chloroprene modified acrylic emulsion likely to be used as an adhesive for automobile interior materials, building decoration materials, packaging materials and furniture manufacturing process. This document does not contemplate the use of said emulsion for the assembly of cellulose based substrates in the rigid packaging and bookbinding industries. The viscosity of said emulsion is further much lower than required by the equipment used in these latter 2 industries for the application of the adhesive on the substrates of interest.

The patent application WO 95/15998 filed by DU PONT DE NEUMOURS teaches blends of chloroprene homopolymers (or copolymers) with chloroprene/acrylate or chloroprene/methacrylate graft copolymers which provide compositions especially useful as components of latex adhesive formulations. This document does not contemplate the use of said compositions for the assembly of cellulose based substrates in the rigid packaging and bookbinding industries.

The present invention aims at solving the need for an adhesive composition with rheological properties adapted to the application devices implemented in the rigid packaging and bookbinding industries, and which can be implemented for the manufacturing of assemblies comprising a cellulose-based substrate, said assemblies providing a high strength adhesive joint and fast bonding properties.

It has now been found that this aim can be achieved, in whole or in part, by means of the water-based adhesive composition forming the subject matter of the present invention.

The present invention relates first to a water-based adhesive composition comprising, on the basis of its total weight:
  from 30% to 60% by weight (expressed as dry content) of a chloroprene modified acrylic emulsion (A); and
  from 0.05% to 0.45% by weight (expressed as dry content) of a water soluble polymer (B) selected among xanthan gum and konjac gum;
  said composition being obtainable by a process (P) comprising a first step (i) of dissolving into water polymer (B) in the form of a powdered solid, so as to obtain a composition (S) consisting essentially of a water solution of polymer (B).

The choice of polymer (B), as a specific thickening agent, as well as its specific process of incorporation into the chloroprene modified acrylic emulsion (A), makes possible to obtain a homogenous and stable water-based adhesive composition which presents a viscosity range suited to the application devices operated in the rigid packaging and bookbinding industries. In addition, said water-based adhesive composition also provides the wet tack and high strength adhesive joint required properties when it is applied on a cellulose-based substrate.

In the water-based adhesive composition according to the invention, water is brought by the chloroprene modified acrylic emulsion (A), with optional addition of water. Indeed, depending on the water dilution of (A) and (S), one may be lead to adding water for obtaining the desired active material concentration expressed as dry content.

According to a preferred embodiment, the viscosity at room temperature of the water-based adhesive composition according to the invention is comprised in a range from 150 to 5000 mPas·s, preferably from 200 to 4000 mPa·s. The viscosity is measured with a Brookfield RVT viscometer equipped with a n° 3 spindle rotating at 20 rotations per minute. Unless otherwise stated, all viscosities mentioned in the present text are measured by the same method.

According to a preferred embodiment, the chloroprene modified acrylic emulsion (A) comprised in the water-based adhesive composition, is an aqueous dispersion comprising polychloroprene and at least one polymer (C) obtained starting from one or more monomers selected in the group comprising, and more preferably consisting of: meth(acrylic) acid, meth(acrylate) esters, styrene and acrylonitrile.

According to another preferred embodiment, the chloroprene modified acrylic emulsion (A) is an aqueous dispersion consisting essentially of polychloroprene and polymer (C).

By the abbreviated term "meth(acrylic) acid", it is intended acrylic acid and methacrylic acid. Similarly "meth(acrylate) esters" means both acrylate esters and methacrylate esters. The meth(acrylate) esters are usually selected among the $C_1$-$C_{10}$ alkyl, $C_1$-$C_{10}$ hydroxyalkyl, and $C_3$-$C_{10}$ cycloalkyl esters.

According to a still more preferred embodiment, the chloroprene modified acrylic emulsion (A) is an aqueous dispersion of polychloroprene and polymer (C), both forming an interpenetrating polymer network (or IPN). In such an aqueous dispersion, the dispersed particles comprise, and preferably consist of, a polychloroprene network intertwined on a molecular scale with polymer (C) network.

Appropriate details about the manufacturing process of the chloroprene modified acrylic emulsion (A) are given in the patent application CN104448152A.

Chloroprene modified acrylic emulsions are also available commercially. LOTER® 990 from the company FOSHAN JINJIA is an example of such a product with:
- 50% by weight in dry content (based on its total weight),
- an IPN structure, and
- a pH of 2-4 and a viscosity at room temperature of about 100 mPa·s.

The content of the chloroprene modified acrylic emulsion (A) (expressed as dry content) in the water-based adhesive composition according to the invention, is preferably comprised in the range going from 35% to 55% by weight, more preferably from 40 to 50% by weight.

In addition to the chloroprene modified acrylic emulsion, the water-based adhesive composition according to the invention comprises, as a thickening agent, a water soluble polymer (B) selected among xanthan gum and konjac gum.

By xanthan gum is meant a class of exocellular polysaccharides made by the hetero-polysaccharide producing bacterium *Xanthomonas Campestris*, and other bacteria of the Genus Xanthomonas, in the whole-culture fermentation of a medium comprising a fermentable carbohydrate, a nitrogen source, and other appropriate nutrients (see e.g., U.S. Pat. Nos. 3,433,708 and 4,316,012). This polysaccharide is believed to have a main chain consisting of a linear backbone of 1,4-linked β-D-glucose and side chains of two mannose and one glucuronic acid. Xanthan gum is widely available commercially in the form of a powdered solid. CS® from the Swiss company JUNGBUNZLAUER AG is an example of such a xanthan gum.

By konjac gum is meant a polysaccharide vegetable gum extracted from the corm of the konjac plant. Konjac gum consists mainly of high-molecular-weight glucomannan polysaccharide that is composed of glucose and mannose units combined through glycosidic linkages. Konjac gum typically contains mannose and glucose in a ratio of approximately 2:1. Konjac gum is widely available commercially in the form of a powdered solid. KJ-28® from the company Konson is an example of such a Konjac gum.

According to a more preferred embodiment, the content of polymer (B), expressed as dry content, in the water-based adhesive composition is from 0.10 to 0.40% by weight.

The water-based adhesive composition according to the invention is advantageously obtained by a process (P) which comprises a first step (i) of dissolving the water soluble polymer (B) (in the form of a powdered solid) into water, so as to obtain a composition (S) consisting essentially of a water solution of polymer (B).

The composition resulting from the dissolution of the water soluble polymer (B) into water consists essentially of a water solution (S) of polymer (B), meaning that only minor quantities of other ingredients may be comprised such as a biocide with a maximum quantity of 1% by weight in solution (S) and a pH adjuster like citric acid with a maximum quantity of 1% by weight in solution (S), said percentages by weight being expressed on the basis of the total weight of (S).

It has been found, surprisingly, that in contrast with the direct incorporation of (B) in the form of a powdered solid into (A), the first step (i) of said process advantageously provides a final composition which is homogeneous, and, in particular, substantially exempt from a gel. In addition, said final composition exhibits a Brookfield viscosity falling in the range from 150 to 5000 mPa·s which is well adapted to the application devices implemented in the rigid packaging and bookbinding industries.

Dissolution of polymer (B) into water is preferably achieved at room temperature.

According to a preferred embodiment, the water soluble polymer (B) is xanthan gum. It has been found that, in that case, the content of the composition (S) in polymer (B) (expressed as dry content) is comprised in the range from 0.5% to 4.5% by weight, on the basis of the total weight of (S), preferably in the range from 1% to 4% by weight, and, even more preferably, in the range from 1% to 3% by weight.

According to another preferred embodiment, the water soluble polymer (B) is Konjac gum. It has been found that, in that case, the content of the composition (S) in polymer (B) (expressed as dry content) must be comprised in the range from 0.5% to 2.5% by weight, on the basis of the total weight of (S), preferably in the range from 1% to 2% by weight.

The process (P) also comprises after step (i) a step (ii) of incorporating (S) into (A). The relative weight quantities of the water solution (S) and emulsion (A) are such as to provide a content of polymer (B) into the final water-based adhesive composition which lays in the desired range from 0.05% to 0.45% by weight (expressed as dry content).

The water-based adhesive composition according to the invention may also comprise usual additives in the field of the water-based adhesive compositions which are currently implemented in the bookbinding or rigid packaging industries. Among such additives, one may cite a quantity of 0.1 to 0.4% by weight of a biocide (fungicide or bactericide) in order to protect the composition against attacks, in particular bacterial attacks, or a quantity of 0.1 to 0.3% by weight of an anti-foaming agent in order to reduce the formation of foams during the implementation of the adhesive composition. Other optional additives include wetting agent or fillers.

The present invention also relates to the use of the water-based adhesive composition such as defined above for the bonding of at least one cellulose based substrate. Such cellulose based substrate is, in particular, selected among cardboard, papers of various weights and various surface coatings (for instance matt paper and glossy paper) and cellulose based nonwoven fabrics.

According to a preferred embodiment the cellulose based substrate able to be bonded by the water-based adhesive composition according to the invention is a glossy paper having one face coated with a UV primer, preferably an acrylic primer. The corresponding assembly advantageously exhibit good wet tack properties and a high strength adhesive joint.

According to an embodiment, the cellulose based substrate is bonded to another cellulose based substrate. As an example, an assembly of a cardboard with a UV primer coated glossy paper may be cited.

According to another embodiment, the cellulose based substrate is bonded to a non cellulose based substrate, and more preferably to a PolyVinylChloride (PVC) film, Poly-EthyleneTerephtalate (PET) film or a low surface tension plastic film such as Oriented PolyPropylene (OPP) film.

The water-based adhesive composition according to the invention is preferably used in the rigid packaging industry for the assembly of cardboards or in the bookbinding and/or graphic arts industry.

The following examples are given purely to illustrate the invention, but should not be interpreted as limiting its scope.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 17187319.3, filed Aug. 22, 2017, are incorporated by reference herein.

EXAMPLE A (REFERENCE)

Water solutions of xanthan gum were prepared by dissolving (at room temperature) xanthan gum powder into water, in order to obtain the concentrations pointed out here-below:

TABLE 1

| | Water solution (S) of xanthan gum | | |
|---|---|---|---|
| xanthan gum concentration (% by weight expressed as dry content) | 2.5 | 3 | 5 |

Example 1: Water-based Adhesive Dispersion Comprising LOTER® 990 and Xanthan Gum, Prepared Starting from the Xanthan Gum Water Solution (S) at 2.5%

100 g of LOTER® 990 were added to a plastic cup and stirred at a speed of 600 rpm with an appropriate mixer.

An appropriate amount of the water solution (S) with 2.5% xanthan gum (prepared according to example A) was then gradually introduced into the plastic cup, so as to obtain a concentration in xanthan gum in the final adhesive dispersion (expressed in dry content) of 0.12% by weight. During the introduction of (S), an increase of the viscosity was visually observed.

After complete introduction of (S), a homogeneous adhesive dispersion was obtained in which the concentration of LOTER® 990, expressed as dry content, was 47.6% by weight.

Its viscosity at room temperature was measured (with a Brookfield RVT viscometer equipped with a n° 3 spindle rotating at 20 rotations per minute) and found to be 250 mPa·s.

Wet Tack Test:

The wet tack property was assessed by the following test.

The substrate to be used for this test was a rectangular strip (15 cm×5 cm) of a glossy printing paper with a weight of about 355 g/m² which was coated on its glossy face by a layer of an acrylic UV primer with a thickness corresponding to 5 g/m².

The water-based adhesive dispersion was coated by means of a brush on a rectangular area (1 cm×5 cm) located at one end of the UV primer coated surface of the strip. The coating weight of the water-based adhesive which was so applied was about 20 g/m² (expressed in wet).

Immediately after the application, the rectangular strip of 15 cm×5 cm was shaped into an open cylinder of 5 cm height, by adhering the 1 cm×5 cm coated area with the non UV primer coated surface, in such a way as to create an overlapping area (or bonding area) of 5 cm×1 cm.

Adhering was made by hand-pressing said overlapping area, corresponding to a pressure of about 0.5 MPa which was maintained during 5 seconds. Then, the pressure was released.

One could observe that the bonding area remained stable, despite the shear stress exerted by the tension of the paper cylinder.

This observation pointed to a good wet tack property.

Bonding Test:

The wet tack test was repeated until the assembly of the two 5 cm×1 cm areas of UV primer coated surface and non coated surface and formation of the paper cylinder.

Then, said paper cylinder was allowed to stay 1 day at room temperature, for drying.

After one day, manual peeling of the bonding area was done and resulted in the destruction of the substrate, which was an evidence of the high strength of the adhesive joint.

Bonding Test after Accelerated Storage:

The wet tack test was repeated until the assembly of the two 5 cm×1 cm areas of UV primer coated surface and non coated surface and formation of the paper cylinder.

Then, said paper cylinder was subjected to the following low-high temperature cycle:

60 minutes to switch from 23° C. and 50% Relative Humidity (RH) to 80° C. and 80% RH, then 240 minutes to stay at 80° C. and 80% RH, then 120 minutes to switch from 80° C. and 80% RH to −40° C., then 240 minutes to stay at −40° C., then 60 minutes to switch from −40° C. to 23° C. and 50% RH.

After that, this cycle was repeated 7 times.

It was then found that the bonding area remained stable and no delamination was observed.

Examples 2-5: Water-based Adhesive Dispersions Comprising LOTER® 990 and Xanthan Gum Example 1 was repeated, using the water solution (S) of xanthan gum pointed out in Table 2 and adjusting the amount of said solution (S) introduced into the plastic cup in order to obtain the concentrations in LOTER® 990 and xanthan gum (both by weight expressed as dry content) which are shown in Table 2.

A homogeneous adhesive dispersion was also obtained with the Brookfield viscosity pointed out in Table 2.

The wet tack test, bonding test, and bonding test after accelerated storage gave the same results.

Example 6 (Comparative)

Example 1 was repeated, except that xanthan gum was introduced directly as a powder in LOTER® 990 in such an amount as to target a concentration (based on the total weight of the composition) of 0.12% by weight, without implementation of the water solution (S).

Immediate formation of a gel was observed and no homogeneous adhesive dispersion could be obtained.

Example 7 (Comparative)

Example 1 was repeated, using the water solution (S) with 3% xanthan gum and introducing gradually, into the plastic cup, an amount of it corresponding to a targeted concentration in LOTER® 990 and xanthan gum (both by weight expressed as dry content) which are shown in Table 2.

However, during the introduction, the formation of a gel was observed.

After the introduction, no homogeneous adhesive dispersion was obtained.

TABLE 2

| | Content in % by weight | | | | | | |
|---|---|---|---|---|---|---|---|
| Ingredient | Ex. 1 | Ex. 2 | Ex. 3 | Ex. 4 | Ex. 5 | Ex. 7 (comp.) | Ex. 8 (comp.) |
| LOTER ® 990 (% by weight expressed as dry content) | 47.6 | 45.5 | 47.6 | 45.5 | 43.5 | 41.7 | 47.6 |
| Xanthan gum | 0.12 | 0.23 | 0.14 | 0.27 | 0.39 | 0.50 | 0.24 |
| Xanthan gum content in water solution (S) (% by weight expressed as dry content) | 2.5 | 2.5 | 3 | 3 | 3 | 3 | 5 |
| Brookfield viscosity of the adhesive dispersion (mPa · s) | 250 | 1350 | 450 | 1750 | 2750 | — | — |

Example 8 (Comparative)

Example 7 was repeated, using the water solution (S) with 5% xanthan gum and introducing gradually, into the plastic cup, an amount of it corresponding to a targeted concentration in LOTER® 990 and xanthan gum (both by weight expressed as dry content) which are shown in Table 2.

The same observations were made.

Example 9 (Comparative): Water-based Adhesive Dispersion Comprising LOTER® 990 and an Alkali Swellable Acrylic Thickener Alkali swellable acrylic thickener Viscoatex® 730 (from Coatex) was used, which is a water-based dispersion with a pH of 3 and 30% by weight in dry content.

100 g of LOTER® 990 were added to a plastic cup and stirred at a speed of 600 rpm with an appropriate mixer. The pH was adjusted to 6-7 by adding suitable amount of ammonia water.

After the introduction of 0.1 g of Viscoatex® 730, a homogeneous adhesive dispersion was obtained, with a Brookfield viscosity of about 1000 mPa·s.

The wet tack performance was assessed by repeating the wet tack test described in Example 1, with the result that the bonding area of the cylinder opened, releasing the corresponding ends of the paper strip. This observation pointed to a lack of the wet tack property.

EXAMPLE B (REFERENCE)

Water solutions of Konjac gum were prepared by dissolving (at room temperature) Konjac gum powder into water, in order to obtain the concentrations pointed out here-below:

TABLE 3

| | Water solution (S) of Konjac gum | |
|---|---|---|
| Konjac gum concentration (% by weight expressed as dry content) | 2 | 3 |

TABLE 3-continued

| Water solution (S) of Konjac gum |
|---|

Example 10: Water-based Adhesive Dispersions Comprising LOTER® 990 and Konjac Gum, Prepared Starting from the Konjac Gum Water Solution (S) at 2%

Example 1 was repeated, except that the water solution (S) with 2.5% xanthan gum was replaced by the Konjac gum water solution (S) at 2%, which was introduced into the plastic cup, so as to obtain a concentration in Konjac gum in the final adhesive dispersion (expressed in dry content) of 0.10% by weight.

A homogeneous adhesive dispersion was also obtained with the Brookfield viscosity pointed out in Table 4.

The wet tack test, bonding test, and bonding test after accelerated storage gave the same results.

Examples 11-13: Water-based Adhesive Dispersion Comprising LOTER® 990 and Konjac Gum Example 10 was repeated, using the water solution (S) of Konjac gum pointed out in Table 4 and adjusting the amount of said solution (S) introduced into the plastic cup in order to obtain the concentrations in LOTER® 990 and Konjac gum (both by weight expressed as dry content) which are shown in Table 4.

A homogeneous adhesive dispersion was also obtained with the Brookfield viscosity pointed out in Table 4.

The wet tack test, bonding test, and bonding test after accelerated storage gave the same results.

Example 14 (Comparative)

Example 10 was repeated, except that Konjac gum was introduced directly as a powder in LOTER® 990 in such an amount as to target a concentration (based on the total weight of the composition) of 0.10% by weight, without implementation of the water solution (S).

Immediate formation of a gel was observed and no homogeneous adhesive dispersion could be obtained.

Example 15 (Comparative)

Example 10 was repeated, using the water solution (S) with 3% Konjac gum and introducing gradually, into the plastic cup, an amount of it corresponding to a targeted concentration in LOTER® 990 and Konjac gum (both by weight expressed as dry content) which are shown in Table 4.

However, during the introduction, the formation of a gel was observed.

After the introduction, no homogeneous adhesive dispersion was obtained.

TABLE 4

| Ingredient | Content in % by weight | | | | |
|---|---|---|---|---|---|
| | Ex. 10 | Ex. 11 | Ex. 12 | Ex. 13 | Ex. 15 (comp.) |
| LOTER ® 990 (% by weight expressed as dry content) | 47.6 | 45.5 | 43.5 | 41.7 | 47.6 |
| Konjac gum | 0.10 | 0.20 | 0.30 | 0.40 | 0.15 |
| Konjac gum content in water solution (S) (% by weight expressed as dry content) | 2 | 2 | 2 | 2 | 3 |
| Brookfield viscosity of the adhesive dispersion (mPa · s) | 500 | 1000 | 2000 | 3000 | — |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A water-based adhesive composition comprising, on the basis of its total weight:
   from 30% to 60% by weight (expressed as dry content) of a chloroprene modified acrylic emulsion (A); and
   from 0.05% to 0.45% by weight (expressed as dry content) of a water soluble polymer (B) that is xanthan gum or konjac gum;
   said composition being obtained by a process (P) comprising a first (i) dissolving into water polymer (B) in the form of a powdered solid, so as to obtain a composition (S) consisting essentially of a water solution of polymer (B).

2. The water-based adhesive composition according to claim 1, having a viscosity at room temperature of 150 to 5000 mPas·s.

3. The water-based adhesive composition according to claim 1, having a viscosity at room temperature of 200 to 4000 mPa·s.

4. The water-based adhesive composition according to claim 1, wherein the chloroprene modified acrylic emulsion (A) is an aqueous dispersion comprising polychloroprene and at least one polymer (C) obtained starting from one or more monomers that are meth(acrylic) acid, meth(acrylate) esters, styrene or acrylonitrile.

5. The water-based adhesive composition according to claim 4, wherein the chloroprene modified acrylic emulsion (A) is an aqueous dispersion of polychloroprene and polymer (C), both forming an interpenetrating polymer network.

6. The water-based adhesive composition according to claim 1, having a content of chloroprene modified acrylic emulsion (A) of 35% to 55%.

7. The water-based adhesive composition according to claim 1, wherein the water soluble polymer (B) is xanthan gum.

8. The water-based adhesive composition according to claim 1, wherein the water soluble polymer (B) is Konjac gum.

9. A method for bonding of at least one cellulose based substrate, comprising bonding said cellulose based substrate to an additional substrate using the water-based adhesive composition of claim 1.

10. The method according to claim 9, wherein the cellulose based substrate is cardboard, paper or cellulose based nonwoven fabrics.

11. The method according to claim 9, wherein the cellulose based substrate is a glossy paper having one face coated with a UV primer.

12. The method according to claim 9, wherein the cellulose based substrate is bonded to a non cellulose based substrate.

13. A method according to claim 9, wherein the substrate is part of an assembly of cardboards in the rigid packing industry or in the bookbinding and/or graphic arts industry.

14. The method according to claim 11, wherein the UV primer is an acrylic primer.

15. The method according to claim 12, wherein the cellulose based substrate is bonded to a PolyVinylChloride (PVC) film, PolyEthyleneTerephtalate (PET) film or a low surface tension plastic film.

* * * * *